US006331813B1

(12) United States Patent
Belliveau

(10) Patent No.: US 6,331,813 B1
(45) Date of Patent: Dec. 18, 2001

(54) MULTIPARAMETER DEVICE CONTROL APPARATUS AND METHOD

(76) Inventor: Richard S. Belliveau, 10643 Floral Park, Austin, TX (US) 78759

( * ) Notice: Subject to any disclaimer, the term of this patent is extended or adjusted under 35 U.S.C. 154(b) by 0 days.

(21) Appl. No.: 09/318,139

(22) Filed: May 25, 1999

(51) Int. Cl.[7] .......... H04M 11/04

(52) U.S. Cl. .......... 340/310.01; 315/312; 362/233

(58) Field of Search .......... 340/310.01, 310.02, 340/332; 362/233, 85, 284, 272; 315/312

(56) References Cited

U.S. PATENT DOCUMENTS

| | | | | |
|---|---|---|---|---|
| 3,845,351 | | 10/1974 | Ballmoos et al. | 315/293 |
| 3,924,120 | | 12/1975 | Cox, III | 250/199 |
| 4,200,862 | | 4/1980 | Campbell et al. . | |
| 4,392,187 | * | 7/1983 | Bornhorst | 362/233 |
| 4,418,333 | | 11/1983 | Schwarzbach et al. . | |
| 4,797,795 | * | 1/1989 | Callahan | 362/233 |
| 4,837,665 | * | 6/1989 | Hoyer et al. | 362/96 |

OTHER PUBLICATIONS

Silent Servant Home Control, Inc., "Automated Home Control", 1998, pp. 1–9, Titusville, FL. (May not be prior art).
High End Systems, Inc., "Status Cue®", pp. 1–8, Austin, TX. Mar. 3, 1999 (May not be prior art).
High End Systems, Inc., "Studio Spot™ Automated Luminare", pp. 1–10, Austin TX. Mar. 3, 1999 (May not be prior art).
High End Systems, Inc., "Studio Color™ LCD", 1–5, Austin, TX. Mar. 3, 1999 (May not be prior art).

* cited by examiner

*Primary Examiner*—Brent A. Swarthout
(74) *Attorney, Agent, or Firm*—Walter J. Tencza, Jr.

(57) ABSTRACT

The present invention in one embodiment incorporates multi-parameter lighting devices within a power line carrier system or apparatus. The apparatus comprises a power line, a control device, and a first lighting device. The power line may supply a primary signal having a frequency. The control device may include at least one actuation device which may be a plurality of actuation devices. The control device may be connected to a first power outlet of the power line. The first lighting device may have a plurality of parameters. The first lighting device can include a processor and first motor. The first motor of the lighting device can be used to vary a first parameter of the plurality of parameters of the first lighting device. The first lighting device can be connected to a second power outlet of the power line. The control device can send out a first secondary signal on the power line in response to actuation of at least one actuation device and the first secondary signal can have a frequency which is different from the frequency of the primary signal. The processor of the first lighting device can respond to the first secondary signal by causing the position of the first motor to change and thereby changing the first parameter of the plurality of parameters of the first lighting device. The first secondary signal can be a digitally modulated carrier signal and the frequency of the first secondary signal can be the carrier frequency of the first secondary signal. The first motor of the first lighting device can be in a prior position before the processor of the first lighting device receives the first secondary signal from the power line and the processor can change the position of the first motor incrementally or to an absolute position. Pre-set commands can be used to vary parameters of the lighting device.

3 Claims, 6 Drawing Sheets

FIG 4
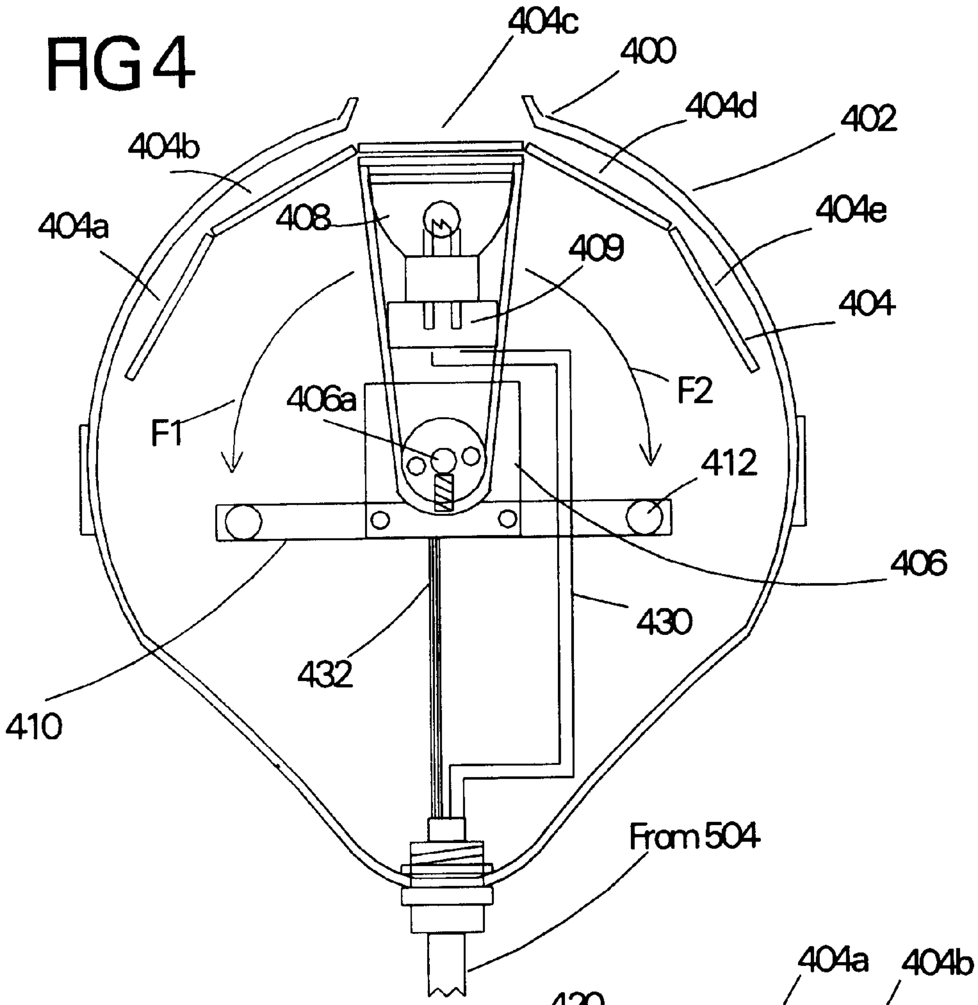
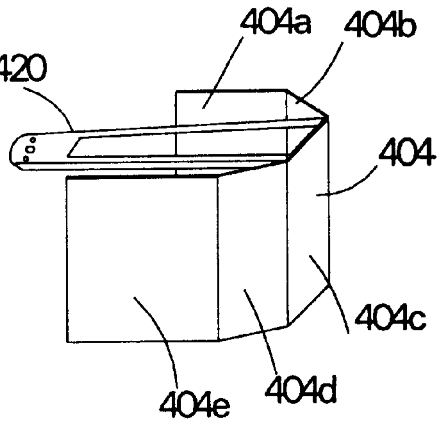
FIG 5

MULTIPARAMETER DEVICE CONTROL APPARATUS AND METHOD

FIELD OF THE INVENTION

This invention relates to improved methods and apparatus for control of devices such as appliances and lights through power lines.

BACKGROUND OF THE INVENTION

There are various methods and apparatus known in the art for control of devices such as household appliances and lights. One known method and apparatus includes sending digitally modulated carrier communication signals along a power line to control household appliances and lights. These types of systems are generally called power line carrier systems. Generally speaking, sending communication signals over power lines for the purpose of turning appliance motors on and off is known. Sending communications signals over power lines for the purpose of turning lights on and off or for dimming lights, generally, is known.

Appliance power line carrier or communication systems are shown in U.S. Pat. No. 4,200,862 to Cambell, incorporated by reference herein, and U.S. Pat. No. 4,418,333 to Schwarzbach, incorporated by reference herein. These systems have been well developed to provide economical control of home lighting. Control systems of this type are readily and economically available from companies such as "X10 USA" (trademarked).

With the advent of satellite TV and Home Theater there is a desire by the consumer to create more complete entertainment centers in the home. These centers might consist of big screen television, large sound systems that may include karaoke, and lighting systems that help to set a mood. Home lighting control may consist of several appliances or lamps controlled over a power line carrier. This type of control system is an easy retrofit by the consumer as expensive new wiring through out the house is not required. These power line communication systems are generally inexpensive and available through many wholesalers and distributors.

Multi-parameter lighting devices are known in the realm of stage shows such as rock concerts. These lighting devices have been created to control a wide variety of functions such as color, shutter, iris, pan, tilt, and pattern projection. See U.S. Pat. No. 4,302,187 to Bomhorst, incorporated by reference herein, and U.S. Pat. No. 3,845,351 to Ballmos et. al., incorporated by reference herein. However, these multi-parameter lighting devices generally require a dedicated communications line, in addition to and separate and apart from their power lines. These multi-parameter lighting devices are typically controlled in a wired serial data type of remote control. A dedicated communications wire is plugged into each light. The wire starts at the control device and loops to each multiparameter light.

Multiparameter lighting devices made for stage shows are often very expensive and require expensive computer control systems. Lights of this type require expensive dedicated high reliability communication systems. Undesired noise on the communication lines could be seen during operation of the lighting instruments and could cause unsightly distractions during performances. Often times lights of this type are utilized under control of an operator and the time from the input of the operator to the resulted change of a parameter in the light must be visually instantaneous.

SUMMARY OF THE INVENTION

It is seen by the inventor that lights with multiparameters like that used in commercial stage shows will be of interest to the consumer for use in home entertainment systems. The present invention in one embodiment incorporates multi-parameter lighting devices within a power line carrier system or apparatus.

In one embodiment of the present invention an apparatus is provided comprising a power line, a control device, and a first lighting device. The power line may supply a primary signal having a frequency. The control device may include at least one actuation device which may be a plurality of actuation devices. The control device may be connected to a first power outlet of the power line. The first lighting device may have a plurality of parameters. The first lighting device can include a processor and first motor. The processor as used in the present application may be a computer processor, an integrated circuit, an electronic circuit, or one or more such devices. The first motor of the lighting device can be used to vary a first parameter of the plurality of parameters of the first lighting device. The first lighting device may be connected to a second power outlet of the power line.

The control device can send out a first secondary signal on the power line in response to actuation of at least one actuation device and the first secondary signal can have a frequency which is different from the frequency of the primary signal. The processor of the first lighting device can respond to the first secondary signal by causing the position of the first motor to change and thereby changing the first parameter of the plurality of parameters of the first lighting device.

The actuation of at least one actuation device can occur automatically such as with a timer or the actuation can occur by an operator. The first secondary signal can be a digitally modulated carrier signal and the frequency of the first secondary signal can be the carrier frequency of the first secondary signal. The frequency of the primary signal can be sixty hertz. The frequency of the first secondary signal can be one-hundred twenty kilohertz.

In one embodiment the first motor of the first lighting device is in a prior position before the processor of the first lighting device receives the first secondary signal from the power line and the processor changes the position of the first motor incrementally from the prior position in response to the first secondary signal. In another embodiment the first motor of the first lighting device changes the position of the first motor to a first absolute position in response to the first secondary signal regardless of the prior position of the first motor.

In one embodiment actuation of at least one actuation device (which can be a timer having no operator buttons) creates a first pre-set command which is sent within the first secondary signal along the power line to the processor of the first lighting device and the processor of the first lighting device changes the position of the first motor of the first lighting device to a first absolute position in response to the first pre-set command regardless of the prior position of the first motor.

In another embodiment a second lighting device having a plurality of parameters is provided. The second lighting device includes a processor and a first motor which is used to vary a first parameter of the plurality of parameters of the second lighting device. The second lighting device can be connected to a third power outlet of the power line, wherein the primary signal powers the second lighting device. The control device can send out a second secondary signal on the power line in response to actuation of at least one actuation device of the control device and the second secondary signal can have a frequency which is different from the frequency of the primary signal. The processor of the second lighting device can respond to the second secondary signal by causing the position of the first motor of the second lighting device to change and thereby change the first parameter of the plurality of parameters of the second lighting device.

In another embodiment the first lighting device and the second lighting devices may be responsive to the same first secondary signal to cause one of their parameters to be modified.

In another embodiment the first lighting device may include an address selector. When the address selector is set to a first address, the processor may be responsive to the first secondary signal, if an address signal within the first secondary signal corresponds to the first address. The processor of the first lighting device may also be responsive to the first secondary signal if the address signal of the first secondary signal corresponds to a second address which the processor determines based on the first address. If the processor is responsive to the first secondary signal, the processor changes a parameter of the plurality of parameters of the first lighting device. The address selector may be comprised of two switches, which together set the first address. The processor may determine the second address by applying a constant offset to the first address.

BRIEF DESCRIPTION OF THE DRAWINGS

FIG. 4 shows the internal structure of a multiparameter light for use with a multiparameter lighting device in accordance with an embodiment of the present invention;

FIG. 5 is a drawing of a bracket attached to a color filter array for use with the multiparameter light of FIG. 4;

DETAILED DESCRIPTION OF THE DRAWINGS

Figure 1:
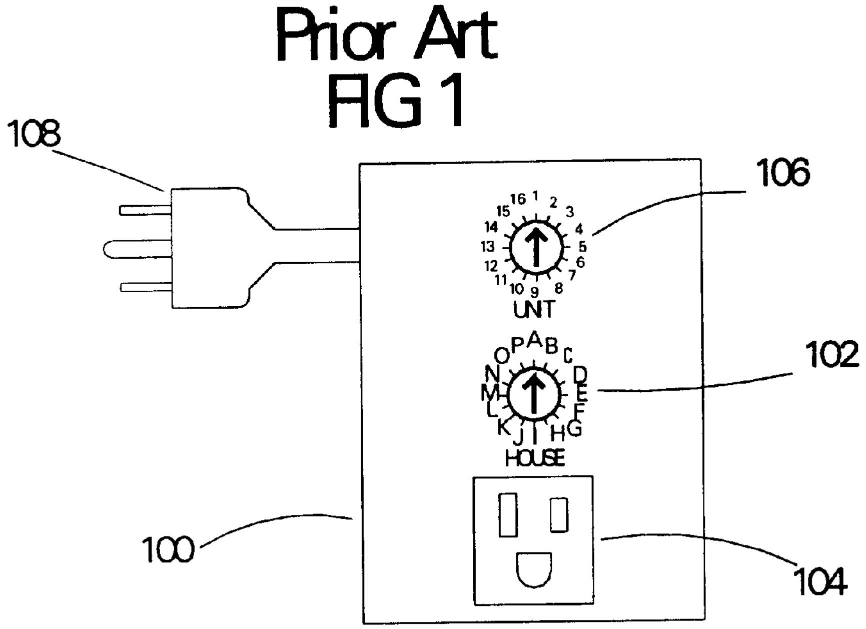
Prior Art FIG 1
FIG. 1 shows an appliance device known in the art for use in a power line control system.

FIG. 1 shows an appliance device 100 of a type known in the art for use in a power line control system. The appliance device 100 may be of the type used with an "X10" (trademarked) power line control system. The appliance device 100 includes letter house address selector 102, a number unit address selector 106, a socket 104, and a plug 108.

Figure 2:
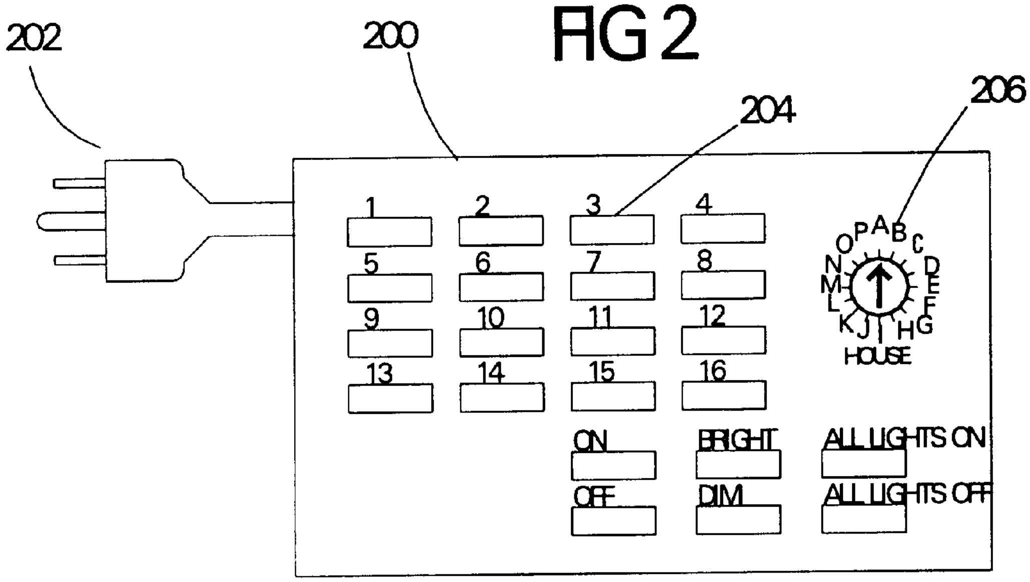
FIG. 2 shows a control device known in the art for use with the FIG. 1 appliance device in a known power line control system.

FIG. 2 shows a control device 200 known in the art for use with the appliance device 100 of FIG. 1 in a known power line control system. The control device 200 includes a plug 202, a plurality of operator actuation devices 204 which are labeled 1 through 16 and ON, OFF, DIM, BRIGHT, ALL LIGHTS ON, and ALL LIGHTS OFF, and a letter house address selector 206.

Figure 3:
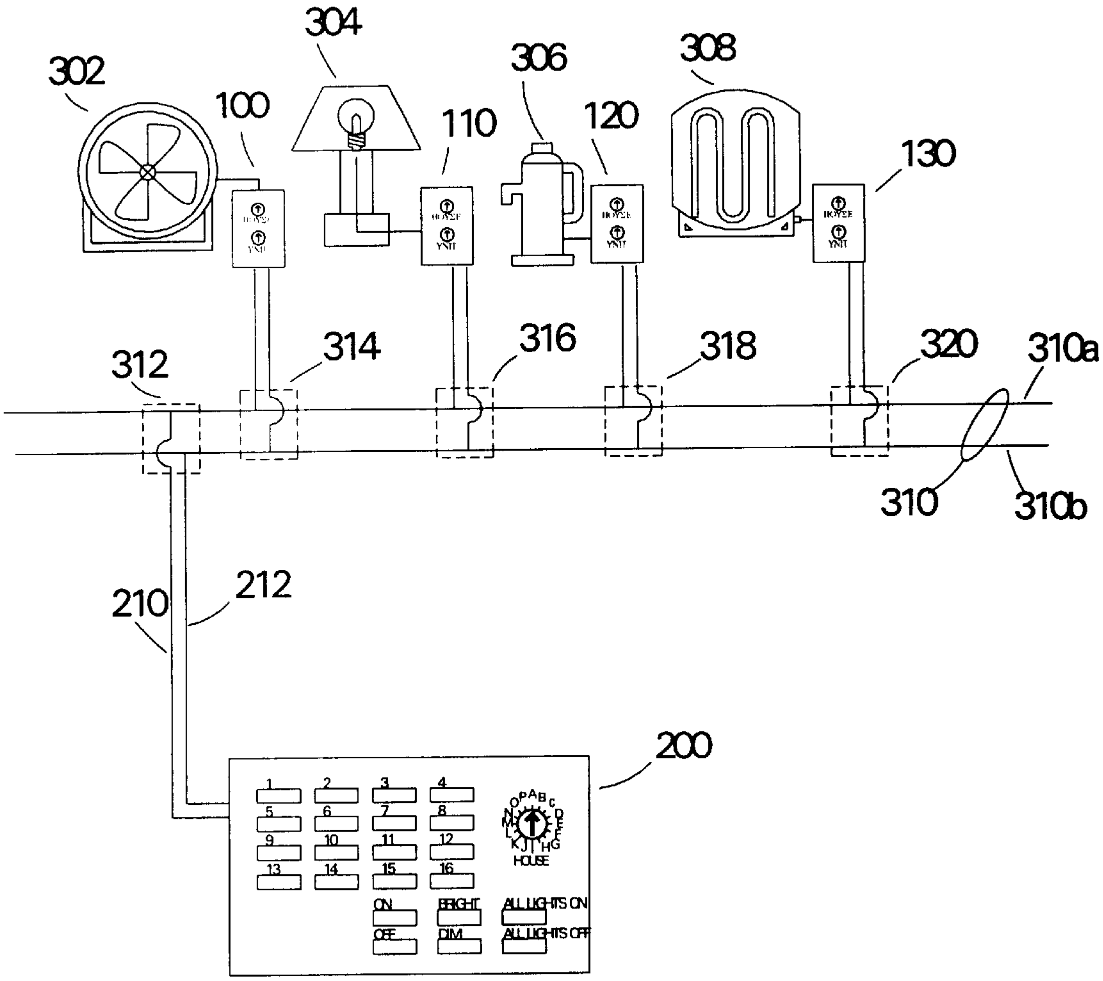
Prior Art FIG 3
FIG. 3 shows the control device of FIG. 2 and a plurality of the appliance devices of FIG. 1 and a plurality of appliances connected to a power line in a known power line control system configuration.

FIG. 3 shows the control device 200 of FIG. 2 and a plurality of appliance devices similar to appliance device 100 of FIG. 1 and a plurality of appliances connected to a power line 310 in a known power line control system configuration 300. FIG. 3 shows appliances 302, 304, 306, and 308. Each appliance has a power plug which is connected to the socket of its appropriate appliance device. For example, the appliance 302 which is a fan has a plug which is connected to the socket 104 of the appliance device 100. Appliances 304, 306, and 308 are connected in a similar manner to appliance devices 110, 120, and 130 respectively. Appliance 304 is a typical simplistic lamp (it can either be turned on or off or dimmed). Appliance 306 is an electric coffee maker. Appliance 308 is room heater.

The plug 108 of the appliance device 100 is connected to a socket of an outlet of the power line 310 at the location 314 of FIG. 3. Similarly the locations 316, and 318 are where the plugs of the appliance devices 110, 120, and 130 are connected to other outlets of the power line 310. The plug 202 of the control device 200 is connected at the location 312 to another outlet of the power line 310.

In operation, the prior art system 300 of FIG. 3 functions as follows. The house letter address selector 102 on the appliance device 100 is set to a house address, such as for example "A". Similarly the house letter address selectors on the appliance devices 110, 120, and 130 are also set to the letter "A". The house address selector 206 of the control device 200 is also set to the letter "A". Each appliance device has its number unit address selector set to a number. For example the appliance device 100 may have its number unit address selector 106 set to "1". One of the operator actuation devices of the set 204 can then be activated to control one of the appliances. The operator actuation devices 204 can be push buttons. In this example, if the operator actuation device labeled "1" on the control device 200 is activated (such as by pressing a button), then the appliance device 100 is controlled (since its unit address selector 106 is set to "1"). An operator can next press a function operator actuation device such as the operator actuation device of set 204 labeled "ON". The pressing of these two operator actuation device buttons in sequence causes the appliance device 100 to turn on the fan 302. In order to accomplish this, the control device 200 sends what will be called a first "secondary signal" comprised of an address signal (for A1) and a function signal (for turning something on) out on its lines 210 and 212 which are connected to the lines 310*a* and 310*b*, respectively of the power line 310. The signal is received by the appliance device 100 which recognizes that it's a signal for the address unit number "1" and that the function is to turn on the appliance which is connected to it which is appliance 302. The appliance device 100 then switches the power from power line 310 to the appliance 302. In power line communications systems like the "X10" (trademarked) the signal sent to control the appliance 302 can be a 120 kilohertz signal which is digitally modulated to transmit the unit address and the function.

FIG. 4 shows the internal structure of a multiparameter light 400 for use with a multiparameter lighting device in accordance with an embodiment of the present invention. The multiparameter light 400 includes external housing 402, color filter array 404, stepper motor 406, a lamp 408, a lamp socket and holder 409, and two stops 410 and 412. Multiparameter light 400 includes conductors 430 and 432 which are electrically connected to track connector 504. The color filter array 404 has filter components 404*a* through 404*e*. The stepper motor 406 includes rotatable shaft 406*a*. The rotatable shaft 406*a* is connected to the bracket 420 which is connected to the color filter array 404 so that the color filter array 404 can rotate to place different color array elements (i.e. different color filters) 404*a–e* in front of the lamp 408. The bracket 420 rotates along a radius of motion of the motor 406, which is shown by rotation directions Y1 and Y2 on FIG. 4.

Significantly, the stops 410 and 412 prevent the rotatable shaft 406*a* and the bracket 420 from rotating any further than approximately 90 degrees clockwise or counterclockwise from the position shown in FIG. 4. This is useful because by restricting the continuous rotation the parameter will reach an end point of travel. The stops 410 and 412 are useful during the homing process.

The homing process may take place as follows. When power is first applied to the lighting device 500, stepper motor 406 may move color filter array 404 and bracket 420 a preprogrammed number of steps in a direction pre-chosen by microprocessor code in process 507 shown in FIG. 7B. The motor 406 continues to move color filter array 404 and bracket 420 in that direction until the bracket 420 contacts either stop 410 or stop 412. The bracket 420 having intersected one of the stops should remain intersected while the stepper motor 406 tries to move the bracket 420 against the stop for the duration of the preprogrammed number of steps. Once the preprogrammed number of steps in the chosen direction has been implemented by the processor 507 and moved by the stepper motor 406 against one of the stops of 410 or 412, the operating code used by the microprocessor 507 assumes that the bracket 420 is against a stop and may move the motor 406 in the opposite direction, a predetermined number of steps, until the color filter array 404 has reached a "home position". This "home position" may center the array element 404*c* in front of the lamp 408. From this position the processor 507 may move the stepper motor 406 either direction to place different elements of 404*a–e* into the path of the light, while keeping count of the steps required to move the motor 406 and array 404. By moving stepper motor 406 and keeping count from the "home position" the processor 507 will not allow the bracket 420 to intersect either stop 410 or 412 as an intersection of either stop would cause the processor 507 to have an erroneous location of array 404 with reference to the home position.

After the lighting device 500 has found "home" during power up it then looks to see what location it should go to. As stated in the paragraph above if the lighting device 500 does not receive a command within a secondary signal from the control device 200 then it will go to a predetermined position (in the case of no commands from the power line 310 it will probably go to the center position, with array element 404*c* in front of the lamp 408). Once a command with the right address has been sent the motor 406 driving the color array filter 404 responds to the command. If it is "Dim" or "Brighten" command the motor 406 moves the shaft 406*a* a predetermined amount, every time the lighting device 500 receives a command from the control device 200. While receiving multiple brighten commands the motor 406 will move shaft 406*a* the same increments or degrees every time a brighten command is repeated. The processor 507 keeps count and knows how many commands it can accept before it hits one of stops 410 or 412 (say for example stop 410 for the "BRIGHT" direction.) This will be the same in the opposite direction if you hold down "DIM" (i.e. the bracket 420 never hits stop 412). If at any time the motor 406 should receive a pre-set command, the processor 507 will know where the motor shaft 406*a* is and move the motor shaft 406*a* (and thus bracket 420) the appropriate number of counts until it has reached the position commanded by the preset.

If you hold down the actuation device of set 204 labeled "BRIGHT" and the power line 300 has noise that causes "erroneous transmissions to be received" by the lighting device 500 the operator of control device 200 may think that it has moved the color array 404 to the last or farthest color available but since the signal received by the device 500 is erroneous it may not have received all of the many repeats of the brighten command. In this case it would have not moved as far as the operator or control device 200 might think it would. By holding down a "DIM" or "BRIGHT" (brighten) actuation device on the control device 200 the device will continue to move the color array 404 all the way in one direction until the electronics or processor 507 in the device 500 counts that it has moved all the way in one direction. Then the operator will know that it has reached the extent of the dim or brighten limits. The operator can then move the color array 404 to the location preferred (this assumes that the erroneous data has subsided).

Dim and brighten are separate commands generated by the control device 200. Typically, with inexpensive X10 transmitters (which do not have pre-set dimming commands), when a user presses a button (say "DIM" of set 204 on control device 200) a command goes out within a secondary signal to the appliance device such as device 100, to dim one increment. If a user continues to hold the DIM button down the commands continue. The more the user holds the button down the more DIM commands are sent to the appliance device 100. The more the commands are sent, the more increments are made at the receiver (lighting device 400) until it has no more dimming to do.

Figure 8:
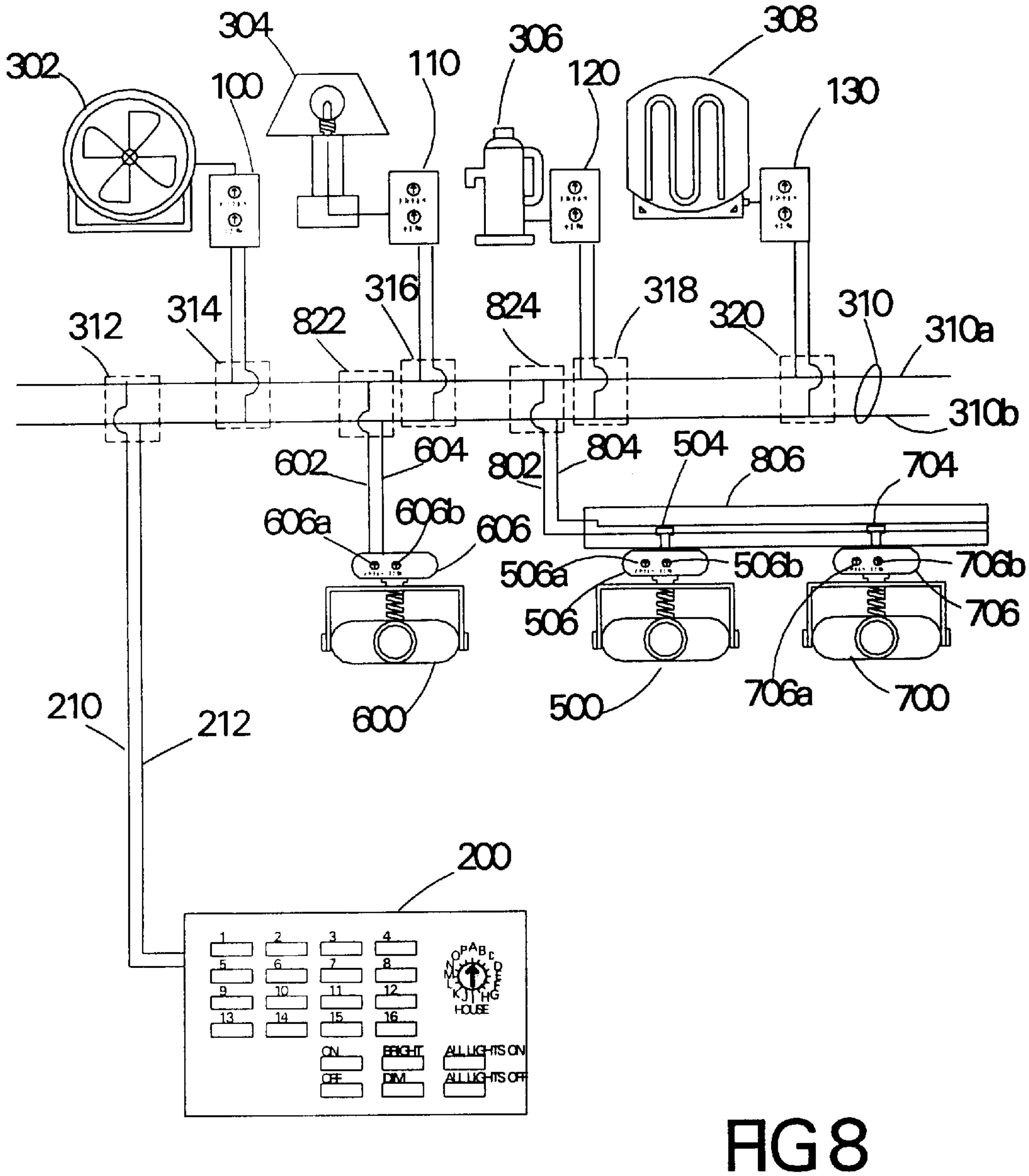
FIG. 8 shows an appliance power line control system incorporating multiparameter lighting devices in accordance with an embodiment of the present invention.

When using more advanced X10 transmitters for the control device 200, that utilize the "hail request" and "hail acknowledge" feature of the extended protocol, the multiparameter lighting device, such as device 500 may include its own transmitter which may inform the control device 200 of FIG. 8 through two way communication that it has not received a brighten or dim command thus always keeping an absolute position of the bracket 420 attached to shaft 406*a* of the motor 406 in relation to the requested transmission signal along the power line 310. A servomotor with an encoder used to sense the mechanical position of the parameter may also be used in place of the step by step motor.

FIG. 5 is a drawing of a bracket 420 attached to a color filter array 404 for use with the multiparameter light 400 of FIG. 4. The bracket 420 is at a ninety degree angle with respect to all of the array components 404*a* through 404*e*.One array component (say the center array component 404*c*) may be blank to pass white light. It may also be a clear glass or a glass filter that absorbs ultra violet.

Figure 6:
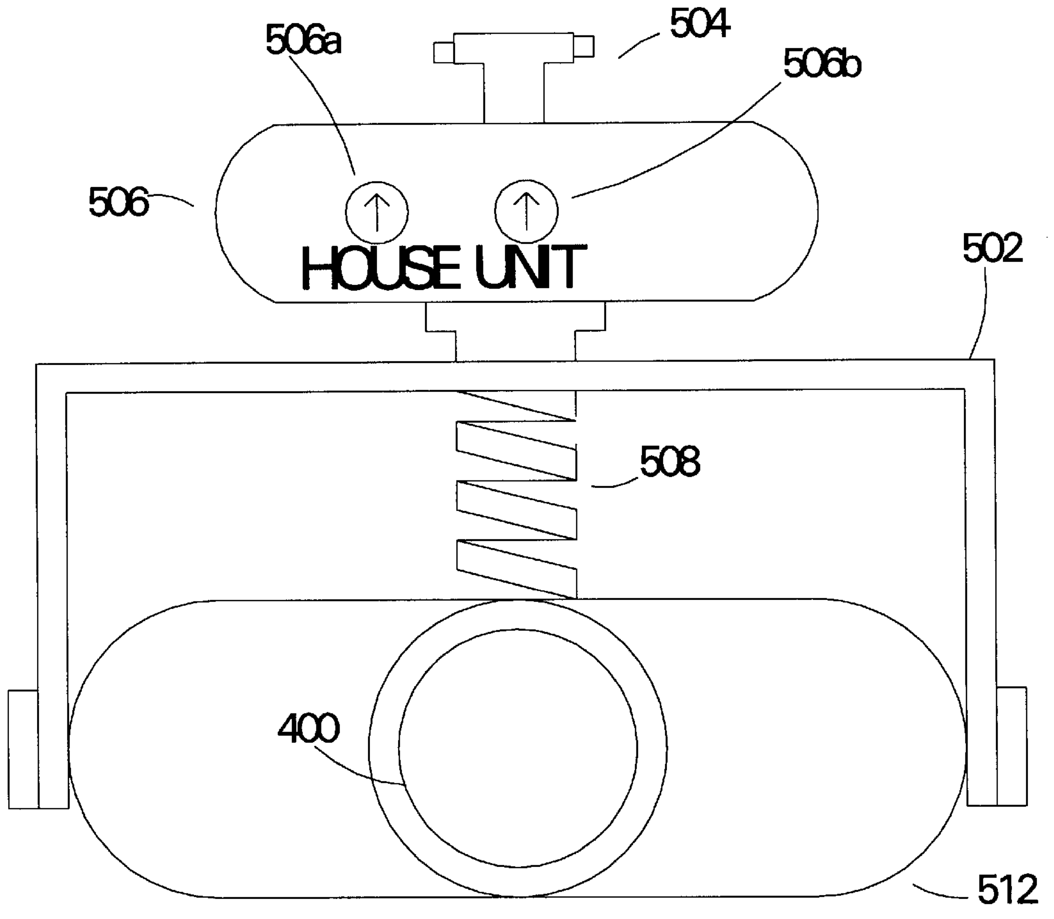
FIG. 6 shows a lighting device having a plurality of parameters for use with an embodiment of the present invention.

FIG. 6 shows a lighting device 500 having a plurality of parameters for use with an embodiment of the present invention. The lighting device 500 includes bracket 502, track lighting connector 504, addressing device 506, coiled cord 508, multiparameter light 400 and housing 512. The addressing device 506 may include a computer processor 507 as will be described with reference to FIG. 7B.

Figure 7A:
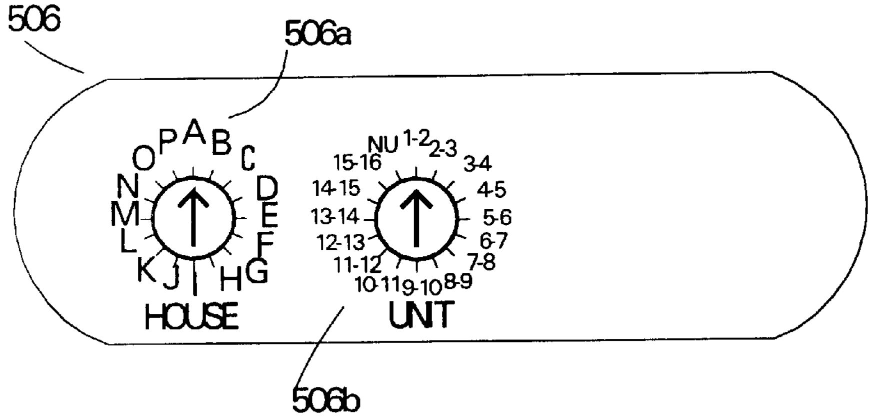
FIG. 7A shows a close-up drawing of the address switching on the lighting device of FIG. 6.

FIG. 7A shows a closeup drawing of the addressing device 506 of the lighting device 500. A house letter address selector 506*a* and a unit number address selector 506*b* are shown in detail. The address selector 506*a* of the lighting device 500 has the same house addresses A through P corresponding to the address selector 206 of the control device 200 shown in FIG. 2. The address selector 506*b* of the lighting device 500 differs from the address selector 106 of the appliance device 100 in that the selector 506*b* can select two addresses, meaning that the device 506 will respond to address signals for units 11 and 12 for example (when set to "11–12") if the address selector 506*b* is appropriately set. The unit addresses 1 through 16 correspond to unit addresses 1 through 16 labeled on the actuation devices of set 204 on control device 200.

What follows is an explanation of how the color filter array 404 and motor 406 work with the processor 507. When used with a simple inexpensive control like control device 200 of FIG. 2 the motor 406 is controlled by "dim and brighten" commands within secondary signals. On a fixture with the unit code set to 1–2 (1 through 2) as shown in FIG. 7A as an example, signals with unit address "1" will control lamp 408 and signals with unit address "2" will control the color filter array 404. To operate the color filter array 404 you first press "2" on the control device 200 then the "BRIGHT" or "DIM" actuation devices of set 204. Pressing the "BRIGHT" actuation device may cause the motor 406 to rotate its shaft 406*a* and thus the color filter array 404, through bracket 420, in a clockwise direction. In that case, pressing the "DIM" actuation device of set 204 would cause the motor 406 to rotate its shaft 406*a* and thus the color filter array 404, through attached bracket 420 in a counter clockwise direction.

Figure 7B:
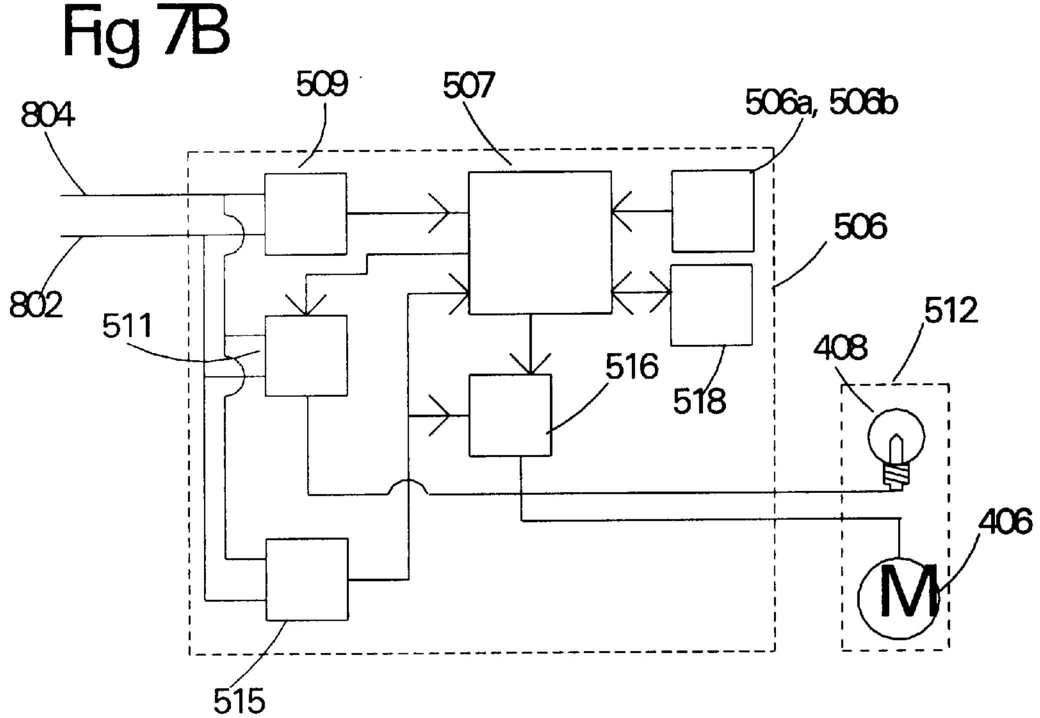
FIG. 7B shows a processor and related components for use in the lighting device of FIG. 6.

FIG. 7B shows address device 506 connected to the lines 802 and 804 of FIG. 8 (which are connected to AC power lines 310*a* and 310*b*) Also shown in FIG. 7B is demodulator 509, signal controlled dimmer circuit 511, DC power supply 515, processor 507, address selectors 506*a* and 506*b*, stepper motor driver 516 for the motor 406, and memory 518. The demodulator 509 is used to isolate the digital signal within the secondary signal from the lines 802 and 804. The electronic circuits (such as circuit 511, 515, 507, 516, and 518 or any further number of electronic circuits) can be thought of as part of a single processor.

In operation, the digital signal within the secondary signal on the power line (comprised of lines 802 and 804 connected to lines 310*a* and 310*b*) is isolated by demodulator 509 and the end result digital signals are sent to the processor 507. The processor 507 determines if the address signal within the secondary signal is valid by comparing it with the settings on 506*a* and 506*b*. If the address is valid the processor 507 looks to memory 518 to see how the command signal within the secondary signal should be responded to. If the response is to dim the lamp 408 to a preset level, the processor 507 sends a signal to the lamp dimmer 511. If the command is to move the motor 406 a certain number of steps then the command is sent to the driver 516 and the processor 507 keeps count.

FIG. 8 shows a power line apparatus 800 incorporating a plurality of multiparameter lighting devices in accordance with an embodiment of the present invention. The power line control apparatus 800 includes the components shown in the prior art system of FIG. 3. The power line control apparatus 800 also includes the multiparameter lighting devices 500, 600, and 700 which may all be similar to multiparameter lighting device 500 shown in FIG. 6. The lines 602 and 604 of the multi-parameter lighting device 600 are connected to the lines 310*a* and 310*b*, respectively, of the power line 310 at location 822. The lines 602 and 604 may end in a plug, which may connect to a socket of an outlet of power line 310 at location 822.

A track device 806 is also shown, which is connected by lines 802 and 804 to lines 310*a* and 310*b* of the power line 310. The track device 806 may include any known track for track lights. The lines 802 and 804 may or may not end in a plug which is connected to an outlet of the power line 310 at location 824. The lines 802 and 804 can also be connected to power line 310 without the use of a plug and outlet. The lighting devices 500 and 700 have their track connectors 504 and 704 inserted in the track device 806 in FIG. 8 so that the lighting devices 500 and 700 can be electrically connected through track device 806 to the power line 310.

The devices 302, 304, 306, 308, 500, 600, and 700 in FIG. 8 all have the house address selectors (102, etc. and 506*a* etc.) of their respective devices (100, 110, 120, 130, 506, 606, and 706) set to the house address "A", which is what the control device 200 house address selector 206 is set to. Each device of devices 302, 304, 306, 308, 500, 600, and 700 has a different unit number address set on the number address selector (106 etc. and 506*b* etc.) of their respective devices (100, 110, 120, 130, 506, 606, and 706). For example device 100 may have its unit address set to "1". Devices 110, 120, and 130 may have their addresses set to 2, 3, and 4 respectively. The lighting devices 500, 600, and 700 have unit number addresses set through their address devices 506, 606, and 706 so that their respective processors (such as processor 507) are responsive to two different unit address signals. For example address device 506 may have its address selector 506*b* set to "5–6". Similarly address device 606 may have its address selector set to "7–8". Address device 706 may have its address selector set to "9–10". The processors, such as processor 507, may store in memory 509 that it will be responsive to a base address (the first address "5" of label "5–6") and a base address plus an offset, which if the offset is one may be second address "6". The processor 507 may provide for further "sequential addressing" by adding further offsets, to form for example third address "7" etc. Each address may permit control over a different parameter of multi-parameter lighting device 500. Address "5" in this example may control the on-off or dimming parameter of lighting device 500 while address "6" may control the motor 406 for moving color filter array 404.

With the above address configuration set, an operator would press the operator actuation device labeled "1" on control device 200 and then the function key labeled "ON" on control device 200 in sequence to turn on the fan 302. Pressing "2", "3", or "4" and then "ON" would turn on the light 304, the coffee pot 306, or the heater 308, respectively. Pressing "5" and then "ON" would cause the address device 506 of the multi-parameter lighting device 500 to turn on the light 408.

For the color filter array 404, (address "6" for this example) this is what would occur: Pressing "6" and then "ON" of actuation devices of set 204 on control device 200: Color array 404 would move to center position with array element 404*c* in front of lamp 408.

Pressing "6" and then "OFF": NO change for color filter array 404

Pressing "ALL LIGHTS ON" Same as "ON" but all devices that have color arrays like 404 should move their color arrays to center position Pressing "ALL LIGHTS OFF": No color arrays in any device change.

For the lamp 408 of the device 400 this is what would occur:

Pressing "5" and the "ON" of set 204 on control device 200: Lamp 408 turns on full, meaning maximum current applied to it.

Pressing "15" and then "OFF": Lamp 408 turns off.

Pressing "ALL LIGHTS ON": All lamps in devices turn on,

Pressing "ALL LIGHTS OFF": All lamps in devices turn off.

The address devices 606 and 706 and the multi-parameter lighting devices 600 and 700 would function similarly to address device 506 and multi-parameter lighting device 500.

The stepper motor, such as stepper motor 406, can change other parameters of a lighting device similar to lighting device 500, such as brightness, color, shutter, iris, pan, tilt, or pattern projection of a lighting device. Such is disclosed in Bornhorst, U.S. Pat. No. 4,302,187. For example, a metal flag may be gradually brought into the light beam as to cause the light beam to "dim". In addition, if we move the flag rapidly it could be a strobe and shutter. Another example may be a wheel which could have colors and patterns on it.

The present invention in one embodiment can be used with the "X-10 USA" (trademarked) remote control home automation system. The basis of this system is best described by U.S. Pat. No. 4,200,863 to Cambell, and this patent is incorporated by reference herein. The X-10 power line carrier ("PLC") system uses receivers (similar to appliance devices 100, 110, 120, and 130, and address devices 506, 606, and 706) that have two rotary dials each having 16 positions. One of the dials displays letter codes A through P, and the other dial displays numbers codes 1 through 16. Therefore a total of 256 unique addresses (using letters A through P and numbers 1 through 16) can be individually addressed.

It is an object of the invention to further the compatibility of a power line carrier system, such as the X10 (trademarked) power line carrier system, with multiparameter lighting devices so that the addressing section of the multiparameter light should contain both the "house code and address number selector" found in the common X10 receivers. The house code and number code selected on the housing of the multiparameter lighting device, in accordance with the present invention, may act only as a "start code" for the sequential number of addresses needed by the multiparameter light as shown in the example by FIG. 7 unit address selector 506*b*.

In the "X10" (trademarked) protocol, which can be used with an embodiment of the present invention, a binary 1 is represented by a 1 millisecond burst of a 120 kHz. frequency signal at the zero crossing point. The 120 kHz signal is the frequency of signals sent from the control device 200 through lines 210 and 212 to the power line 310 to control one or more of the devices 302, 304, 306, 308, 500, 600, or 700. The 120 kHz signal can be of a type called in the application a "secondary signal". The 120 kHz signal can be a digitally modulated carrier signal which is actually comprised of a plurality of digitally modulated carrier signals. The power signal from the power line, which can have a frequency of sixty Hertz will be called a "primary signal". The primary signal powers the devices 302, 304, 306, 308, 500, 600 and 700. The secondary signal may merely be used to control whether the primary signal is applied. The motor 406 action or degrees is typically powered by motor driver 516 in FIG. 7B and the counts are provided by the processor 507 or other electronics such as shown in FIG. 7B. The motor driver 516 may or may not be powered by the power line 310. The secondary signal typically controls the duration of the primary signal applied to a stepper motor 406 to control a parameter.

X10 Specifications—Start

What follows is a description of known specifications of the X10 (trademarked) system merged with a description of the system of FIG. 3. Some of this material (prior to being merged with a description of the system of FIG. 3) may be copyrighted and may have been taken verbatim from manuals describing the operation of the X10 system. The applicant in order to fully comply with his obligations of disclosure has included this material (copyrighted or not) in the patent application.

A binary 0 in the X10 protocol is represented by the absence of a 120 kHz. secondary signal. A complete signal code transmission over power line 310 from control device 200 of FIG. 8 would typically encompass eleven cycles of the primary signal from power line 310. The first two cycles would represent a Start Code. The next four cycles represent the House Code (one of A through P) shown on house address selector 206 of control device 200 of FIG. 2 and the last five cycles represent either a Number Code (one of 1 through 16, corresponding to one of actuation devices 204 labeled "1" through "16") or Function Code (labeled ON, OFF, BRIGHT, DIM, ALL LIGHTS ON, and ALL LIGHTS OFF) This complete block, (Start Code, House Code, Number or Function Code) would be transmitted in groups of 2 with 3 power line cycles of power line 310 between each group of 2 codes. BRIGHT and DIM are exceptions to this rule and should be transmitted continuously (at least twice) with no gaps between codes.

In addition, each bit is sent both true and complemented, and each code sequence (of 11 cycles) is sent twice. A single normal command takes eleven cycles of the primary signal of the AC power line 310 to finish. All legal commands (for an X10 protocol) must first start with the header 1110, a unique code as described below. The header bits take two cycles at one bit per half cycle. The next four cycles are the four-bit House Code, but it takes eight bits total because each bit is sent true then complemented. This is similar to biphase encoding, as the bit value changes state half-way through the transmission, and improves transmission reliability. The last five AC cycles are the Unit/Function Code, a five bit code that takes ten bits (again, true then complemented). For any codes except the DIM, BRIGHT and the data following the EXTENDED DATA function, there's a mandatory three cycle pause before sending another command DIM and BRIGHT don't necessarily need a pause, and the data after the EXTENDED DATA command absolutely MUST follow immediately until all bytes have been sent. The EXTENDED DATA code is handy, as any number of eight-bit bytes may follow. The data bytes must follow the true/complement rule, so will take eight cycles per byte, with no pause between bytes until complete. The only legal sequence that doesn't conform to the true/complement rule are the start bits 1110 that lead the whole thing off, likely because the modules need some way to tell when it's OK to start listening again.

A full code transmission in X10 protocol along power line 310 containing everything looks like this.

| 1 1 1 0 | H8/H8 H4/H4 H2/H2 H1/H1 | D8/D8 D4/D4 D2/D2 D1/D1 F/F |
|---|---|---|
| (start) | (House code) | (Unit/Function code) |

So, to turn on fan appliance 302 (House code A, Unit Code 1) the following signal is sent from control device 200 through lines 210 and 212 to power line 310.

1110 01101001 1001101001(House A, Unit 1) (1)

The control device 200 then waits at least three full AC cycles and then sends the above signal again, then waits three full AC cycles of power line 310 and next sends the signal:

1110 01101001 0101100110(House A, Function ON) (2)

The control device 200 again waits three cycles and sends the above signal the last time. Total transmission would have been 264 discrete bits (don't forget the 3-phase) and would take 53 cycles of the AC primary signal on power line 310, or about 0.883 seconds. If the digital signals shown in (1) and (2) are sent, in the proper manner and order, then the House A, Unit 1 ("A1") fan appliance device 302 would be turned on by appliance device 100. Appliance device 100 includes processor which recognizes the "House A-Unit 1" digital address signal and responds to the "ON" signal by turning on the fan appliance 302. The combination of all of the appropriate signals shown in (1) and (2) needed to turn on the fan appliance 302 will be described as a first secondary signal. Although the signals have been described as digital, they are actually transmitted on the power line 310 by using the digital signals to digitally modulate a carrier signal. The carrier signal would have a frequency of 120 kHz or some other frequency.

It's perfectly allowable to stack the Unit or Function codes together, so sending Unit 2 Unit 3 Unit 4 ON (separated by 3 cycles minimum) will turn on all 3 units which in this case would be light 304, coffee maker 306, and heater 308.

X10 COMMAND CODES

| | House Codes | | | | | Unit/Function Codes | | | | |
|---|---|---|---|---|---|---|---|---|---|---|
| | H8 | H4 | H2 | H1 | | D8 | D4 | D2 | D1 | F |
| A | 0 | 1 | 1 | 0 | 1 | 0 | 1 | 1 | 0 | 0 |
| B | 1 | 1 | 1 | 0 | 2 | 1 | 1 | 1 | 0 | 0 |
| C | 0 | 0 | 1 | 0 | 3 | 0 | 0 | 1 | 0 | 0 |
| D | 1 | 0 | 1 | 0 | 4 | 1 | 0 | 1 | 0 | 0 |
| E | 0 | 0 | 0 | 1 | 5 | 0 | 0 | 0 | 1 | 0 |
| F | 1 | 0 | 0 | 1 | 6 | 1 | 0 | 0 | 1 | 0 |
| G | 0 | 1 | 0 | 1 | 7 | 0 | 1 | 0 | 1 | 0 |
| H | 1 | 1 | 0 | 1 | 8 | 1 | 1 | 0 | 1 | 0 |
| I | 0 | 1 | 1 | 1 | 9 | 0 | 1 | 1 | 1 | 0 |
| J | 1 | 1 | 1 | 1 | 10 | 1 | 1 | 1 | 1 | 0 |
| K | 0 | 0 | 1 | 1 | 11 | 0 | 0 | 1 | 1 | 0 |
| L | 1 | 0 | 1 | 1 | 12 | 1 | 0 | 1 | 1 | 0 |
| M | 0 | 0 | 0 | 0 | 13 | 0 | 0 | 0 | 0 | 0 |
| N | 1 | 0 | 0 | 0 | 14 | 1 | 0 | 0 | 0 | 0 |
| O | 0 | 1 | 0 | 0 | 15 | 0 | 1 | 0 | 0 | 0 |
| P | 1 | 1 | 0 | 0 | 16 | 1 | 1 | 0 | 0 | 0 |

Function Codes

| | | | | | | |
|---|---|---|---|---|---|---|
| All Units Off | 0 | 0 | 0 | 0 | 1 | |
| All Units On | 0 | 0 | 0 | 1 | 1 | |
| On | 0 | 0 | 1 | 0 | 1 | |
| Off | 0 | 0 | 1 | 1 | 1 | |
| Dim | 0 | 1 | 0 | 0 | 1 | |
| Bright | 0 | 1 | 0 | 1 | 1 | |
| All Lights Off | 0 | 1 | 1 | 0 | 1 | |
| Extended Code | 0 | 1 | 1 | 1 | 1 | |
| Hail Request | 1 | 0 | 0 | 0 | 1 | Note 1 |
| Hail Acknowledge | 1 | 0 | 0 | 1 | 1 | |
| Pre-Set Dim | 1 | 0 | 1 | X | 1 | Note 2 |
| Extended Data | 1 | 1 | 0 | 0 | 1 | Note 3 |
| Status is On | 1 | 1 | 0 | 1 | 1 | |
| Status is Off | 1 | 1 | 1 | 0 | 1 | |
| Status request | 1 | 1 | 1 | 1 | 1 | Note 4 |

Note 1: Hail Request is transmitted to see if there are any other X10 compatible control devices (like control device 200) within listening range.
Note 2: In a Pre-Set Dim function, the D1 bit represents the MSB of the level and the 4 House code bits represent the 4 least significant bits. No known X10 device responds to the Pre-Set Dim function.
Note 3: The Extended Data code is followed by eight-bit bytes which can be any data you might want to send (like temperature). In the X10 system there must be no delay between the Extended Data code and the actual data bytes, and no delay between data bytes.
Note 4: The X10 RF to AC Gateway model RR501 is a two-way module. If the RR501 is addressed by transmitting its House Code and Unit Code and then the STATUS REQUEST is transmitted, the RR501 will respond by transmitting Status ON if it's turned on, or Status OFFD is it's off.

These are the recommended specifications to ensure reliable communication to all X10 compatible receivers (processor 507 of the lighting device 500 could be constructed to be an X10 compatible receiver.)

| | |
|---|---|
| Carrier Oscillation Frequency | 120 KHz +/− 5% (s/b 2%, but 5% OK) |
| Zero Crossing Detection | 100 uS +/− 100 uS |
| Width of Transmitted Carrier | 1 mS +/− 50 uS |
| Transmitter output power | 60 mW average (5 V pk-pk into 5 ohms) |
| Isolation Voltage | 2500 V RMS. 60 Hz for 1 min. |

End of known X10 specifications as merged with the description of the system of FIG. 3

Since this set of X10 command codes has been published several manufactures have now incorporated the use of the pre-set dim command into some products. The pre-set dim command allows any of 32 different dimming levels to be assigned to a lamp. This command allows for the receivers (such as appliance devices 100, 110, 120, and 130 and address devices 506, 606, and 706), to be sent a much more simplified transmission by the control device 200 and also defines a specific level of dimming rather than the repeated "dim or brighten commands" which often do not give an absolute level because they require the receivers (100, 110, 120, 130 506, 606, and 706) to receive error free transmission.

It is one object of the invention to creatively utilize the pre-set dim command of the X10 system and protocol (previously described) or some equivalent to advance a stepper or servo motor such as motor 406 of FIG. 4, to an absolute position in a multiparameter lighting device such as device 500 using the pre-set dim command while further allowing general control of the variable parameters with the "dim and brighten" commands. In operation, the motor 406 would be moved to an absolute position as follows. A user would first cause the control device 200 to send the secondary signals shown in equation (1) for lighting device 500 (Start, House Code, Unit Code) and then the secondary signals for equation (2) (Start, House Code, Function Code), where the function code corresponds to the Pre-Set Dim Function Code command. The signals of (1) and (2) together may be thought of as a single overall secondary signal. This would cause the motor 406, the bracket 420, and the color array 404 to move to an absolute position. For example, instead of having array element 404*c* in front of light 408, sending a pre-set dim command of "22" may cause the motor shaft 406*a* to rotate clockwise in direction Y2, until the array element 404*a* is centered in front of the light 408 where 404*c* previously was. The processor 507 can cause this to occur by receiving feedback from the motor 406 (if it is a servo motor) as to the current position of bracket 420. The processor 507 can keep count if motor 406 is a stepper motor in order to determine the current position. The processor 507 can use the current position and the absolute position required to change to the appropriate new position.

This arrangement insures that inexpensive transmitters, if used for control device 200 of FIG. 8, that do not have the capability of the advanced protocol may control the individual functions of the multiparameter lighting device such as device 500, by using the "dim and brighten" features of the X10 protocol, yet the multiparameter lighting device may remain compatible with more full featured control devices 200 using the advanced X10 protocol. When using the "brighten and dim" commands the step motor 406 of FIG. 4 should advance a predetermined step per command for say a "brighten" command and retreat one predetermined step for the "dim" command. A "brighten" secondary signal would be sent out by the control device 200 onto power line when the actuation device of set 204 labeled "BRIGHT" on control device 200 is actuated. When the "brighten" secondary signal reaches the lighting device 500, the processor 507 causes the bracket 420 to rotate a step (for example ten degrees) clockwise from the location shown in FIG. 4 to a second location, not shown. This is assuming that the correct address signal was already given. The bracket 420 could rotate a further step (of for example 10 degrees) clockwise to a third location, not shown when another "brighten" command is made. In a similar manner (for a "dim digital command") the bracket 420 could be caused to rotate counterclockwise ten degrees from the position in FIG. 4, by moving it to a fourth location, not shown. With this method the rotational location of the color filter 404 used in a multiparameter lighting device 500, may be controlled incrementally clockwise or counter clockwise.

In an example of a "gang" channel (which will be described), the lighting devices 500 and 600 may have their processors (such as processor 507) set at the factory so that no matter what the address selectors 506*a* and 506*b*, 606*a* and 606*b* are set to, the processor will always respond to a signal having a certain address. For example they may be set to respond to signals having house code address "P" and unit address "5"This would allow a faster means to control an entire group of lights when adjusting one or more parameters, since addressing each light individually is both time consuming manually to the user as well as the protocol itself may have delays of up to 8 ms per feature per light when controlling a group.

Several "gang addresses" may be used to communicate simultaneously to groups of multiparameter lights. Further more "gang addresses" may be used to record a specific combination of color, dim, pattern, position or more in the memory of the multiparameter lighting device such as device 500. This would be accomplished by first programming the processors (such as processor 507 of FIG. 7B) of the multiparameter light or lights using the method of control described above. Next an operator would send a command on a "gang channel" (this could be any of the commands described above) that would cause the multiparameter light to retain the settings in its memory such as memory 518. In the case of using a "preset command" sent on a gang channel, it would allow for 32 memory allocations.

An additional gang address may be used to recall the "pre-set" that was recorded in the lighting devices' memory such as memory 509 of the lighting device 500 shown in FIG. 7B. Groups of lights could have their parameters recorded by one universal "record" gang address (such as letter code "P" and number code "15") using the 32 dimming pre-sets for the X10 system and then recalled by another gang address (such as letter code "P" and number code "14") for playback.

When controlling multiparameter lights using the X10 command set, the 32 pre-set dim commands used in this invention to control multiparameter lights, may also include some type of macro function. For example a pre-set dim command assigned to a multiparameter light function such as "iris" might include pre-set levels 0 through 20 to control the iris size and pre-set levels 21 through 31 to control reoccurring iris oscillations at different frequencies. Using this scheme you may broaden the features available from the multiparameter light using the X10 Power line carrier system or analogous systems.

In the more complicated multiparameter lighting device having parameters needing higher resolution than 32 discrete levels, several channels could be assigned to the parameter to permit an increase resolution (such as 32 by 32). By using this method the relatively simple X10 Power line carrier system could provide quite high resolution. This is especially useful for parameters of the automated light like pan and tilt that may require a minimum of one-degree resolution (needing 360 different positions).

A "power outlet" is defined in the present application as including any connection to the power line such as a typical home wall outlet (also called an Edison connector), a power track, or a hard wired electrical connection such as a junction box.

A processor in this application would include any computer processor, integrated circuit, electronic circuit, or computer chip.

It would be recognized by one skilled in the art that variations of embodiments disclosed herein can be made within the spirit and scope of the present invention.

I claim:

1. An apparatus comprising:

a first lighting device having a plurality of parameters, wherein the first lighting device includes:
  a processor, and
  a first motor which is used to vary a first parameter of the plurality of parameters of the first lighting device;

wherein the first lighting device receives a primary signal having a frequency from a power line and the primary signal powers the first lighting device;

wherein the first lighting device receives a first secondary signal from power line in response to actuation of at least one actuation device on a control device and the first secondary signal has a frequency which is different from the frequency of the primary signal;

wherein the processor of the first lighting device responds to the first secondary signal by causing the position of the first motor to change and thereby changing the first parameter of the plurality of parameters of the first lighting device;
  wherein the first secondary signal includes an address signal;
  the processor of the first lighting device responds to the first secondary signal if the address signal of the first secondary signal corresponds to a first address;
  the processor determines a second address from the first address;
  the processor responds to the first secondary signal if the address signal of the first secondary signal corresponds to the second address;
  and wherein the processor responds by changing a parameter of the plurality of parameters of the first lighting device.

2. A method comprising:

receiving a primary signal having a frequency from a power line and using the primary signal to power a first lighting device;

receiving a first secondary signal from the power line in response to actuation of at least one actuation device on a control device wherein the first secondary signal has a frequency which is different from the frequency of the primary signal; and responding to the first secondary signal by causing the position of a first motor to change on the first lighting device and thereby changing a first parameter of a plurality of parameters of the first lighting device;
  wherein the first secondary signal includes an address signal;
  responding to the first secondary signal if the address signal of the first secondary signal corresponds to a first address;
  determining a second address from the first address;
  responding to the first secondary signal if the address signal of the first secondary signal corresponds to the second address;
  wherein the step of responding to the first secondary signal includes changing a parameter of the plurality of parameters of the first lighting device.

3. An apparatus comprising a power line having a first power outlet, a second power outlet, and a third power outlet;

a control device including at least one actuation device, the control device connected to the first power outlet;

a first lighting device having a plurality of parameters, the first lighting device connected to the second power outlet, wherein the first lighting device is comprised of a processor;

a lamp;

a first stepping motor;

a track connector;

a color filter comprised of a plurality of color filter components each component lying in a plane; and a housing in which is located the first stepping motor and the color filter of the first lighting device;

wherein the track connector electrically connects the first lighting device to the second power outlet;

wherein the first stepping motor is used to vary a first parameter of the plurality of parameters of the first lighting device;

wherein the first stepping motor has an rotatable shaft which is fixed to a bracket and when the rotatable shaft rotates the bracket rotates in a direction which is at an angle of substantially ninety degrees with respect to each of the planes of the plurality of color filter components;

a second lighting device having a plurality of parameters, the second lighting device connected to the third power outlet, wherein the second lighting device is comprised of a processor;

a lamp;

a second stepping motor;

a track connector;

a color filter comprised of a plurality of color filter components each component lying in a plane; and a housing in which is located the second stepping motor and the color filter of the second lighting device;

wherein the track connector of the second lighting device electrically connects the second lighting device to the third power outlet; and wherein the second stepping motor is used to vary a first parameter of the plurality of parameters of the second lighting device;

wherein the control device sends out a first secondary signal on the power line in response to actuation of at least one actuation device and the first secondary signal has a frequency which is different from the frequency of a primary signal, said primary signal being used to provide power to the first and second lighting devices; and wherein the processor of the first lighting device responds to the first secondary signal by causing the position of the first stepping motor to change and thereby changing the first parameter of the plurality of parameters of the first lighting device;

wherein the first lighting device receives a primary signal having a frequency from a power line and the primary signal powers the first lighting device;

wherein the first lighting device receives the first secondary signal from the power line in response to actuation of at least one actuation device on the control device and the first secondary signal has a frequency which is different from the frequency of the primary signal;

wherein the processor of the first lighting device responds to the first secondary signal by causing the position of the first stepping motor to change and thereby changing the first parameter of the plurality of parameters of the first lighting device;

wherein the first secondary signal includes an address signal and the processor of the first lighting device responds to the first secondary signal if the address signal of the first secondary signal corresponds to a first address;

wherein the processor determines a second address from the first address;

and the processor responds to the first secondary signal if the address signal of the first secondary signal corresponds to the second address;

and wherein the processor responds by changing a parameter of the plurality of parameters of the first lighting device.

* * * * *